United States Patent [19]

Anderson

[11] Patent Number: 5,494,307
[45] Date of Patent: Feb. 27, 1996

[54] GEAR SHIFTING APPARATUS

[76] Inventor: Paul M. Anderson, 3167 Carnegie Pl., San Diego, Calif. 92122

[21] Appl. No.: 118,953

[22] Filed: Sep. 9, 1993

[51] Int. Cl.[6] ....................................................... B62M 9/12
[52] U.S. Cl. .............................. 280/236; 280/261; 474/80
[58] Field of Search .................................... 280/236, 238, 280/359, 260, 261; 474/80, 82, 110

[56] References Cited

U.S. PATENT DOCUMENTS

| | | | |
|---|---|---|---|
| 4,041,788 | 8/1977 | Niniger, Jr. ................................ | 474/80 |
| 4,605,240 | 8/1986 | Clem et al. .......................... | 280/238 X |
| 4,824,420 | 4/1989 | Romano ................................ | 474/80 X |
| 4,894,046 | 1/1990 | Browning .............................. | 474/80 X |
| 4,946,425 | 8/1990 | Bühlmann ........................... | 280/238 X |
| 5,213,548 | 5/1993 | Colbert et al. ....................... | 280/238 X |
| 5,254,044 | 10/1993 | Anderson ................................. | 474/70 |
| 5,358,451 | 10/1994 | Lacombe et al. .................... | 474/80 X |

FOREIGN PATENT DOCUMENTS 2587079  3/1987  France .................................. 280/236

*Primary Examiner*—Kevin T. Hurley
*Attorney, Agent, or Firm*—Ellsworth R. Roston; Charles H. Schwartz

[57] ABSTRACT

A bicycle frame supports a sprocket, front and rear wheels and first gears axially aligned with the rear wheel. Each gear has an individual ratio with the sprocket. At a first end, a support is attached to the frame at two (2) spaced positions, one axially aligned with the rear wheel. When loosened from the frame at such aligned position, the support is pivotable at the other position to provide access to the rear wheel and the gears for maintenance or repair. At its second end, the support holds a hollow shaft in a direction substantially parallel to the gear peripheries. A drive motor, a screw and a yoke mounted on the screw extend in this parallel direction within the shaft. Channels in the shaft receive the yoke to constrain yoke rotation. The motor drives the screw and yoke to position a spool linearly in the parallel direction. A takeup arm movable with the spool carries an additional gear into alignment with an individual one of the gears. A microprocessor is programmed as by handlebar-mounted switches to stop the motor at the proper position for each gear. The microprocessor accomplishes this by monitoring the position of a shaft encoder on the motor. A flexible bellows seals the spool to the support to exclude dirt. A chain extends in a closed loop around the sprocket, the individual gear and an additional gear. A spring adjusts the takeup arm position to eliminate any chain slack when the chain engages the individual gear.

55 Claims, 5 Drawing Sheets

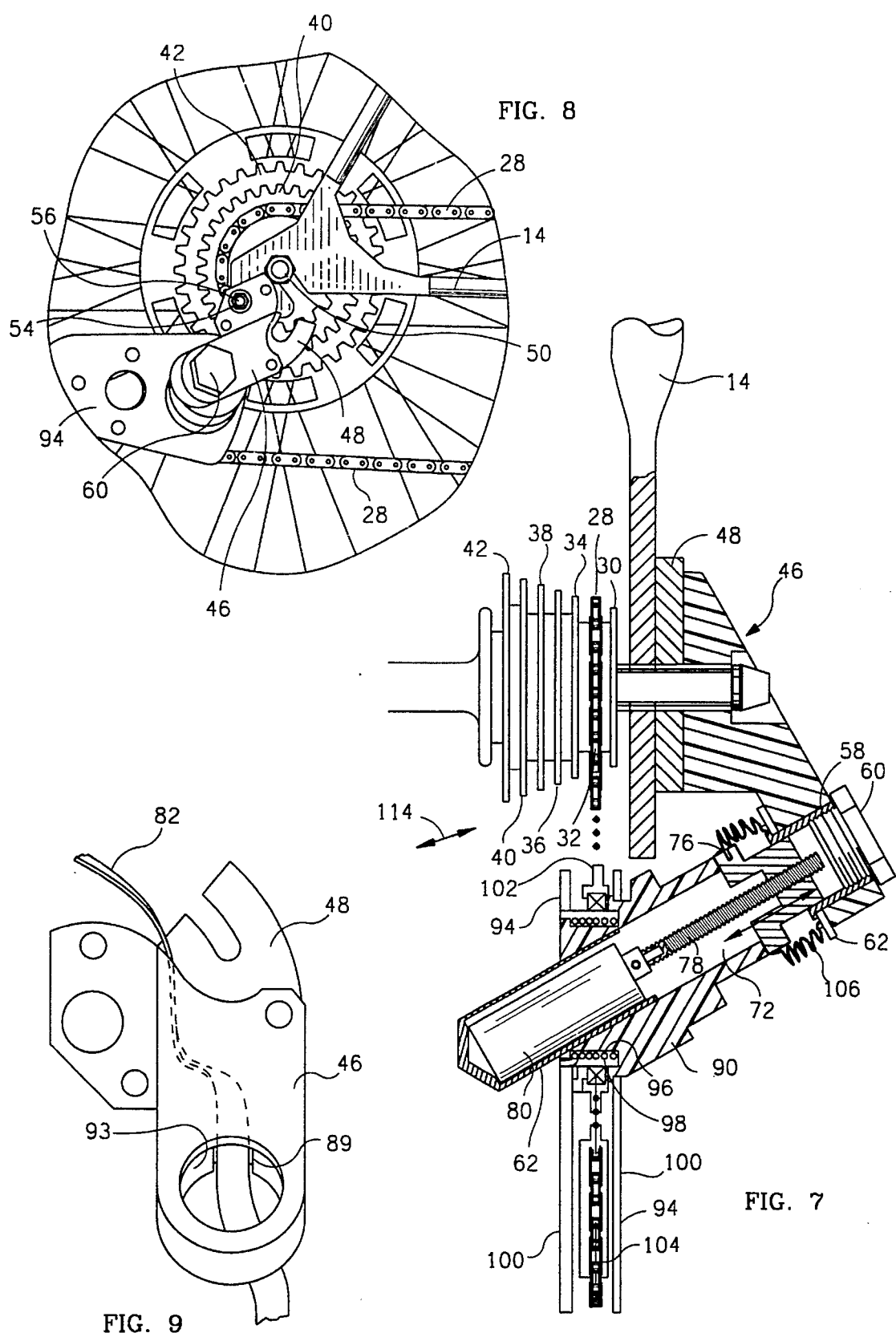

GEAR SHIFTING APPARATUS

This invention relates to apparatus for shifting a chain on a bicycle sprocket to engage individual ones of a plurality of gears on the bicycle to maintain the peddling of a sprocket of the bicycle at a comfortable level regardless of the slope of the surface on which the bicycle is riding. More particularly, the invention relates to apparatus disposed in a compact arrangement substantially parallel to the slope of the peripheries of the gears for shifting a chain on a bicycle sprocket to engage individual ones of the gears, the axes of which are aligned with the rear wheels. In this way, the operation of the bicycle by the cyclist is maintained at a comfortable level regardless of the slope on which the bicycle is riding, and the movement of the chain to the individual gears is provided on a balanced basis and without interfering with the operation of the bicycle by the cyclist.

Bicycles have been known for some time but have progressed technologically substantially only in the past few decades. For example, for many years bicycles have had a sprocket, a front wheel and a rear wheel and a chain coupling the sprocket to the rear wheel to drive the rear wheel at a speed directly related to the rotary speed of the sprocket. This has tended to limit the range of speeds at which the rear wheel could be rotated. It also made it difficult for a cyclist to pedal the bicycle up a hill. Because of this difficulty, cyclists often dismounted from a bicycle and walked with the bicycle up the hill.

A few decades ago, additional gears were provided on the rear wheel in axial alignment with the rear wheel. Manual levers were provided on the handle bar to control the axial disposition of the chain relative to the different gears on the rear wheel. Over a number of years thereafter, the number of gears axially aligned with the rear wheel was progressively increased to decrease the variations in gear ratios between the sprocket and the successive gears axially aligned with the rear wheel. Modern bicycles now have as many as eighteen (18) different gear ratios.

The number of gears axially aligned with the rear wheel has been progressively increased because of the determination and appreciation that cyclists like to rotate the sprocket at a substantially constant speed within particular limits. Thus, as the cyclist starts to ride up a hill, he can progressively decrease the gear ratio between the sprocket and the coupled gear on the rear wheel. This decreases the speed at which the bicycle travels up the hill but allows the cyclist to pedal the sprocket at a comfortable rotary speed.

The apparatus for shifting the chain on the sprocket to the individual gears axially aligned with the rear wheel has generally been called a derailleur. The cyclist adjusts the speed by operating a lever on the handle bar of the bicycle. The level communicates the new selection through a wire cable coupled to the derailleur. Convention derailleurs use a mechanical linkage in the form of a parallelogram. The wire cable responds to the change of position of the lever to operate the mechanical linkage so that an idler gear shifts the chain on the sprocket into coupled relationship with an individual one of the gears.

There are a number of disadvantages in the derailleurs now in use. One disadvantage results from the fact that the mechanical linkages are not in line with the gears on the rear wheel but are in the form of a parallelogram. This prevents the mechanical linkage from having a balanced operation. In other words, as the parallelogram defined by the mechanical linkage shifts to select different gears, the angles between pairs of adjacent sides in the parallelogram change, thereby producing changes in the direction of the forces in the mechanical linkage. This prevents the response of the mechanical linkage to rotations in a screw driven by a drive motor from being linear.

To overcome the disadvantages discussed in the previous paragraph, linear systems in line with the gears on the rear wheel have been provided. Such systems have provided balanced operations. However, the systems have not been compact. This has resulted from the fact that such systems generally include a rotary motor which drives a lead screw as the motor rotates. A nut disposed on the lead screw moves linearly as the lead screw rotates. The nut drives a member disposed on a pair of guides. The member moves to shift the chain on the sprocket to an individual one of the gears axially aligned with the rear wheels.

The drive motor, the lead screw and the driven member are generally disposed end-to-end in the linear arrangement. Because of this, the length of this end-to-end arrangement is generally several times longer than the distance through which the chain on the sprocket has to move in order to be coupled to the different gears. This causes the gear shifter to extend outwardly from the bicycle through a considerable distance. Because of this, the gear shifter is susceptible to damage in everyday use. Furthermore, the gear shifter interferes with the normal operation of the bicycle by the cyclist. The gear shifter also provides an aerodynamic drag against the bicycle movement.

The desirability, and even the need, of compact in-line gear shifter has been known for some time. The desirability, and even the need, of providing a compact gear shifter linearly in line with the gears axially aligned with the rear wheel has become even more urgent in recent years in view of systems which have been recently developed to shift the gear ratio between the sprocket and the gears in the gear shifter so as to maintain the rotary speed of the sprocket within adjustable and pre-selected limits. A considerable effort has been made, and significant amounts of money has been expended, to provide a linear in-line gear shifter which is compact and efficient. However, no such gear shifter has been provided to the time of this invention.

This invention provides a linear gear shifter which is in line with the gears axially aligned with the rear wheel of a bicycle and which is compact and efficient. The gear shifter of this invention is further advantageous because it shields the operative components from the atmosphere and from dirt and from particles dislodged by the bicycle from the road which the bicycle is moving. The gear shifter has a minimal number of parts and particularly a minimal number of moving parts. The gear shifter provides a minimal amount of backlash. The gear shifter provides for easy access to the rear wheel and to the gears axially aligned with the rear wheel when the bicycle has to be serviced to provide repairs or maintenance in the bicycle. The gear shifter is also advantageous in automatically maintaining tension on the chain coupling the sprocket to the individual gears axially aligned with the rear wheel when the chain is moved into engagement with such individual ones of such gears.

In one embodiment of the invention, a bicycle frame supports a sprocket, front and rear wheels and first sprockets or gears axially aligned with the rear wheels. Each sprockets or gear has an individual ratio with the sprocket. At a first end, a support is attached to the frame at two (2) spaced positions, one axially aligned with the gear wheel. When loosened from the frame at such aligned position, the support is pivotable at the other position to provide access to the rear wheel and the gears. At its second end, the support holds a hollow shaft in a direction substantially parallel to the gear peripheries.

A drive motor, a screw and a yoke mounted on the screw extend in the parallel direction within the hollow shaft. Channels in the shaft receive the yoke to constrain the yoke from rotating. The motor drives the screw and the yoke to position a spool linearly in the particular direction. A takeup arm movable with the spool carries an additional gear into alignment with an individual one of the gears. A microprocessor is programmed as by handlebar-mounted switches to stop the motor at the proper position for each gear. The microprocessor accomplishes this by monitoring the position of a shaft encoder on the motor.

A flexible bellows seals the spool to the support to exclude dirt. A chain extends in a closed loop around the sprocket, the individual sprocket or gear and the additional sprocket or gear. A spring adjusts the position of the takeup arm to eliminate any slack in the chain when the chain engages the individual gear.

IN THE DRAWINGS

FIG. 7 is a view similar to that shown in FIG. 5 with the gear shifter in the operative relationship of coupling the chain to an individual one of the gears with a small radius;

FIG. 8 is an enlarged fragmentary front elevational view similar to that shown in FIG. 4 but with certain components in the gear shifter swung out of an operative position on the frame to facilitate access to the rear wheel and to the gears aligned with the rear wheel for facilitating the maintenance and repair of the bicycle;

FIG. 9 is an enlarged fragmentary perspective view of a cable for energizing the drive motor and of members included in the gear shifter for positioning the cable to introduce energy to the drive motor.

Figure 1:
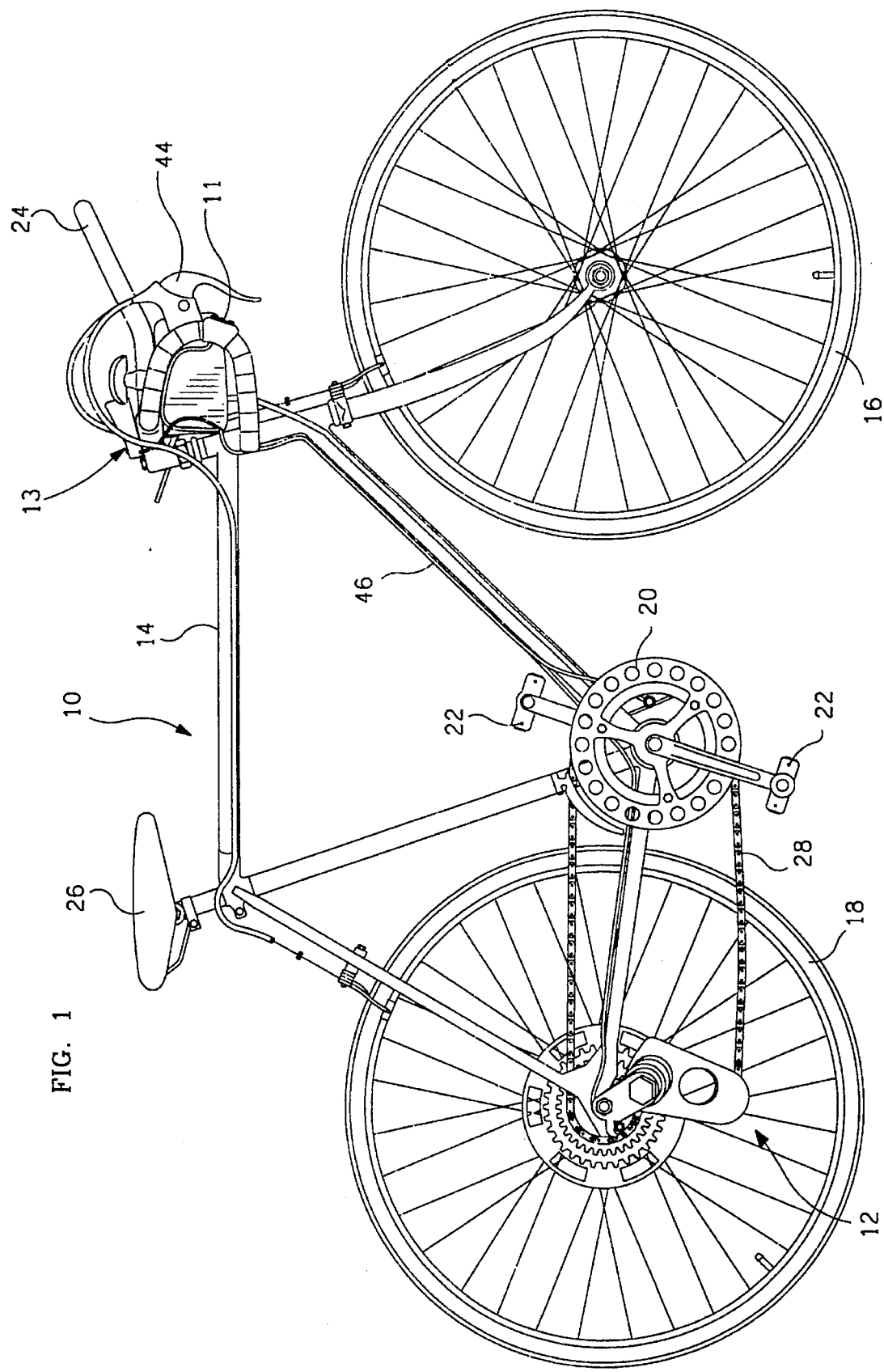
FIG. 1 is a schematic perspective view of a bicycle and of a gear shifter which constitutes one embodiment of the invention and which is attached to the frame of the bicycle at the position of the rear wheel in the bicycle.
Figure 2:
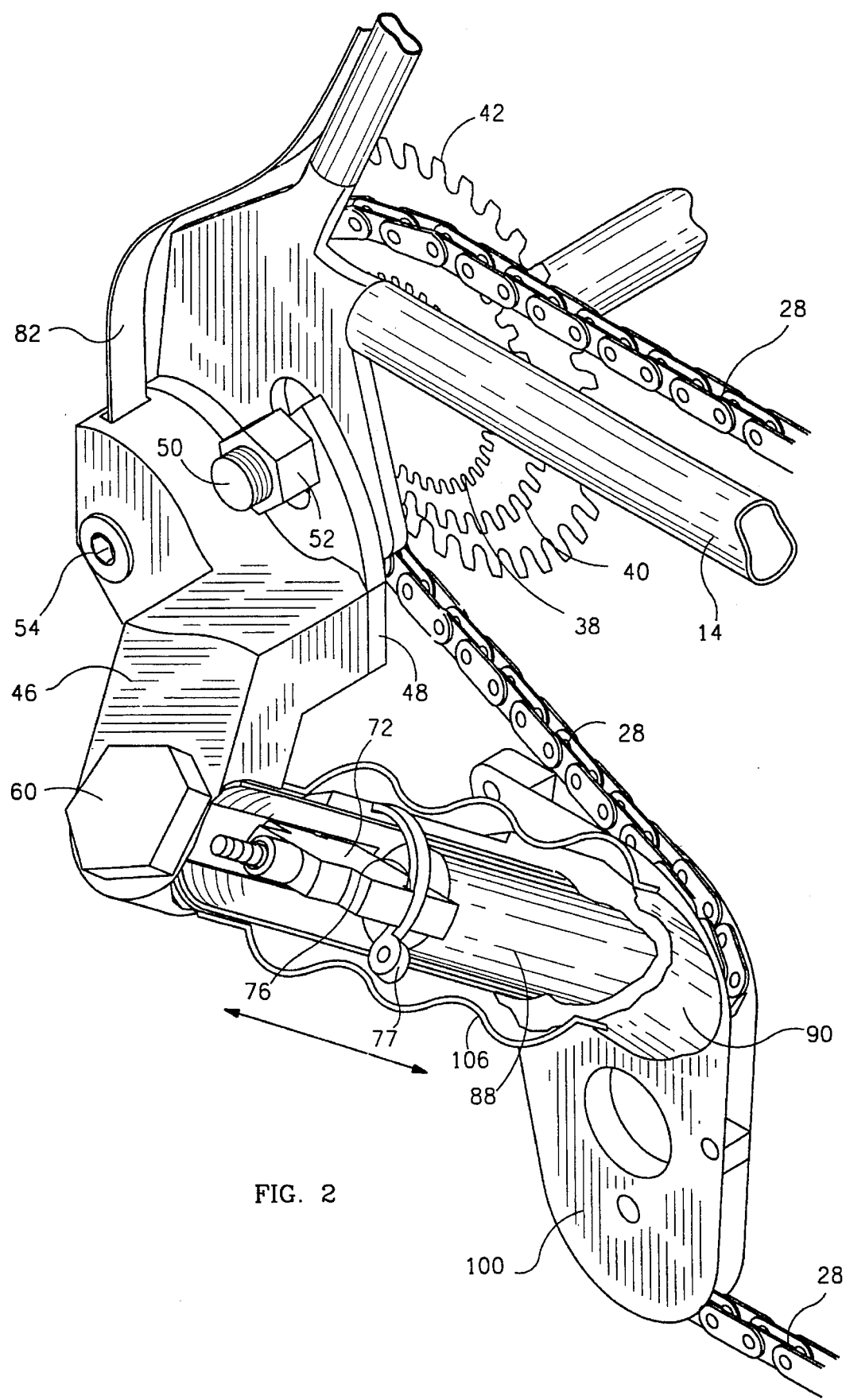
FIG. 2 is an enlarged fragmentary schematic perspective view of a portion of the bicycle frame and of the gear shifter constituting this invention, certain parts in the gear shifter being broken away to show other parts in the gear shifter in additional detail, and also shows a chain and several of a plurality of gears in the gear shifter.

In one embodiment of the invention, a bicycle generally indicated at 10 (FIG. 1) is provided. Except for a gear shifter generally indicated at 12 and included in this invention, control switches 11 and a microprocessor controller 13, the bicycle 10 may be constructed in a conventional manner. For example, the bicycle 10 may include a frame 14, a front wheel 16, a rear wheel 18, a first sprocket 20, pedals 22, a handlebar 24 and a seat 26. A chain 28 may extend around the sprocket 20 and an individual one of a plurality of gears 30, 32, 34, 36, 38, 40 and 42 (FIGS. 2, 3, 4, 5, 7 and 8) which may be considered to be within the gear shifter 12. The gears 30–42 (even numbers only) are mounted in a conventional manner on the frame 14 so that their axes are common with the axis of the rear wheel 18.

The switches 11 communicate through wires to the microprocessor controller 13 to control the operation of a motor (hereinafter described) in shifting the chain 28 to become aligned with individual ones of the gears 30–42 (even numbers only). The lever 44 communicates through a cable 48 in a conventional manner to shift the chain 28 to individual ones of the sprockets or gears 30–42 (even numbers only). When the microprocessor controller 13 is disconnected from the gear shifter 12.

Each of the sprockets or gears 30–42 has an individual gear ratio relative to the sprocket 20 so as to rotate the rear wheel 18 at an individual speed when the sprocket rotates at a constant speed. Although seven (7) gears are shown in the drawings, it will be appreciated that any number of gears can be mounted on the rear wheel to translate the rotation of the sprocket into rotations of the rear wheel 18 at individual speeds. For example, as many as eight (8) gears may be mounted in axial alignment on the frame 14 in axial alignment with the rear wheel 18.

The gear shifter 12 includes a support, generally indicated at 46 (FIGS. 5 and 7), which may be made from a suitable plastic or metal material. The support 46 and a holding plate 48 are supported by a threaded bolt 50 (FIGS. 2, 4 and 8) and a nut 52 on the frame 14 at a position in line with the axis of the rear wheel 18 and the gears 30–42. The bolt 50 extends through the frame 14 and the holding plate 48 and the nut 52 disposed on the screw co-operates with the screw to hold the plate 48 tightly against the frame. In like manner, a threaded bolt 54 extends through the holding plate 48 and the support 46 into screw threads on the frame 14 and holds the holding plate 48 and the support 46 tightly against the frame.

An internally threaded hollow shaft 58 (FIGS. 3, 5 and 7) is disposed in a hole in the support 46 at the end of the support opposite the positions of attachment of the support to the frame 14. The shaft 58 is fixedly positioned relative to the support 46 by a threaded screw 60 which has a body screwed into the shaft and has a head disposed against the support. An externally threaded disc 62 is threaded into the internal threads in the shaft 58 to apply an axial load on a sleeve 88 and then to a motor 80. The back end of the motor 80 is forced against the inside of the closed end of the shaft 58. This force prevents the housing of the motor 80 from rotating during the operation of the motor. A slot 68 is provided in the disc 62 to receive a screw driver for threading the disc 62 in the shaft 58.

A yoke 72 extends radially outwardly through cuts 74 in the shaft 58. The yoke 72 is externally cut as at 76 at the end opposite the cylindrical end 70 to receive a retaining ring 77. A screw 78 extends through the yoke 72 and the internally threaded end 70 of the yoke. The drive motor 80 rotates the screw 78. The drive motor 80 may preferably be a DC brush motor including reducing gears (not shown) and a shaft encoder (not shown). The drive motor 80 including the reducing gears and the shaft encoder is well known in the art.

The drive motor 80 receives power through leads disposed in a ribbon 82 which extends from the drive motor and then along a flat surface 84 (FIG. 3) on the external periphery of the drive motor. The ribbon 82 then extends along a flat surface 86 on the periphery of a sleeve 88. The ribbon 82 then extends through a groove 89 (FIG. 9) in a wall defining a hole 73. The hole 93 is provided in the support 46 to receive the shaft 58 and the threaded screw 60. The ribbon 82 subsequently extends through a cut 91 (FIG. 3) in the support 46 and along the frame 14 to the microprocessor controller 13.

The ribbon 82 may be considered to constitute the cable 46 for supplying power to the drive motor 80 to rotate the screw 78. It may include two (2) wires to power the drive motor 80 and four (4) wires for the shaft encoder included in the motor. The encoder functions as on-off switches as the shaft of the motor 80 rotates. The microprocessor controller 13 counts the pulses from these on-off switches to determine the operative position of the gear shifter 12. The microprocessor 13 then introduces additional signals to operate the motor 80 dependent upon the position determined for the encoder and also dependent upon the operative position of the gear shifter 12.

Figure 3:
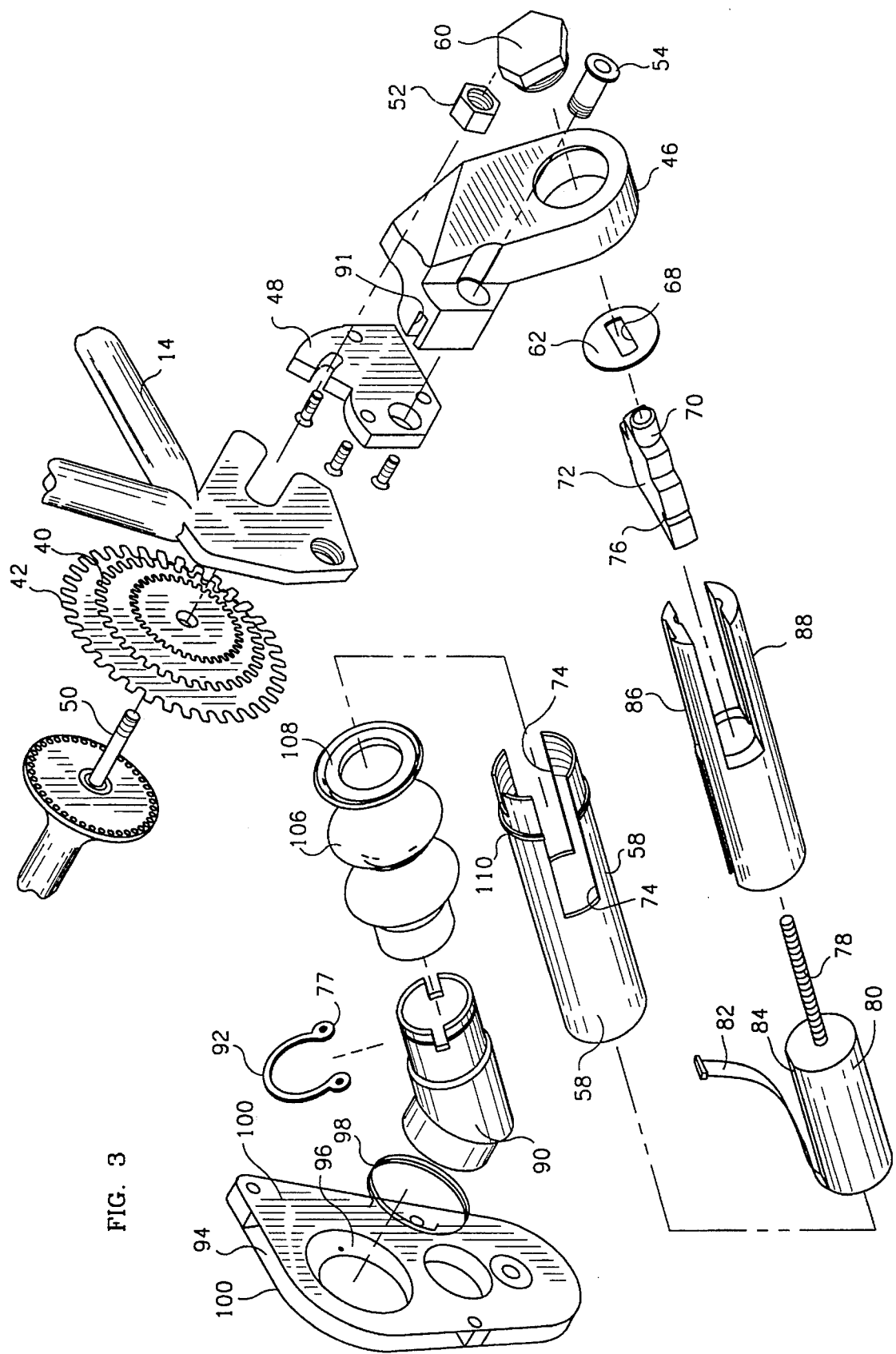
FIG. 3 is an enlarged exploded perspective view of different components in the gear shifter.
Figure 4:
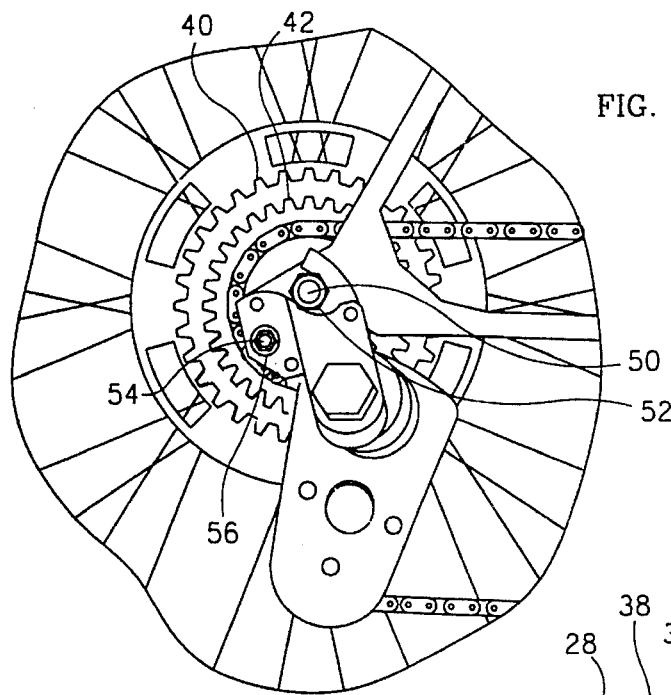
FIG. 4 is enlarged fragmentary front elevational view of the rear wheel of the bicycle, the gear shifter, the chain and the gears individually coupled to the chain in accordance with the operation of the gear shifter.
Figure 5:
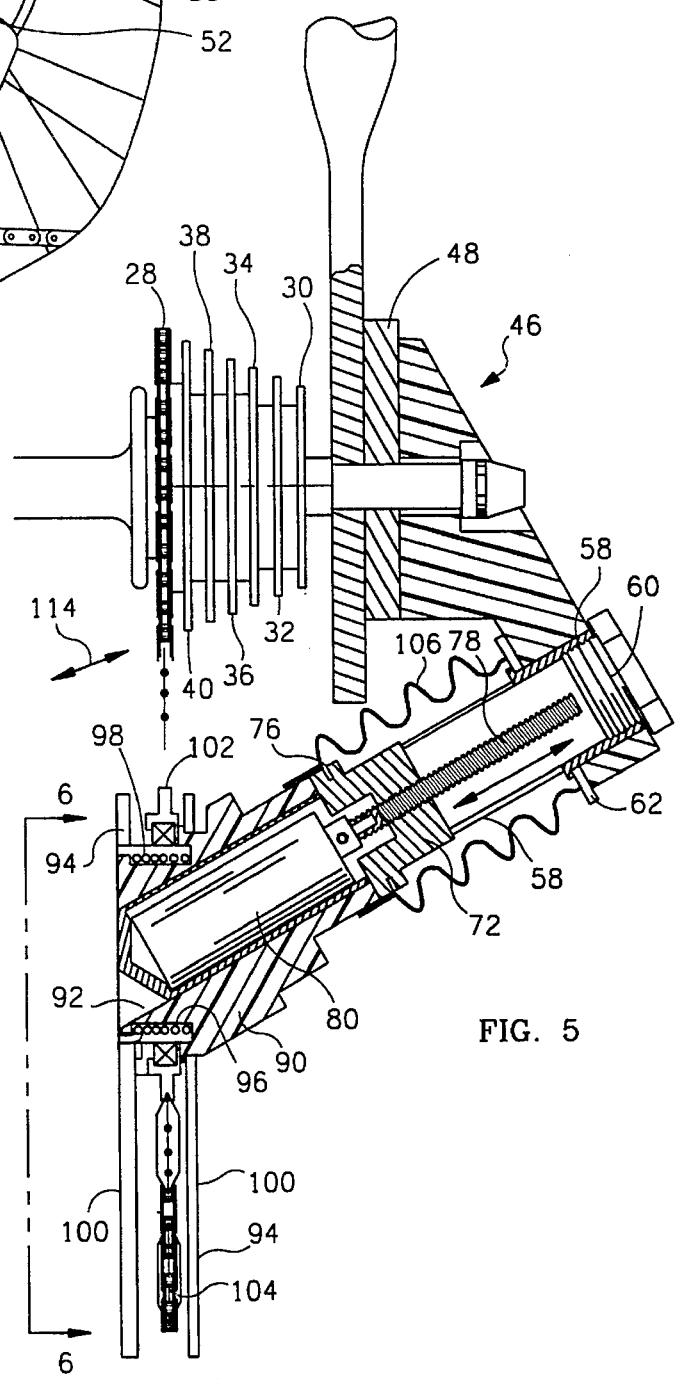
FIG. 5 is a sectional view of the frame and the gear shifter with the gear shifter in the operative relationship of coupling the chain to an individual one of the gears in the gear shifter with the largest radius.
Figure 6:
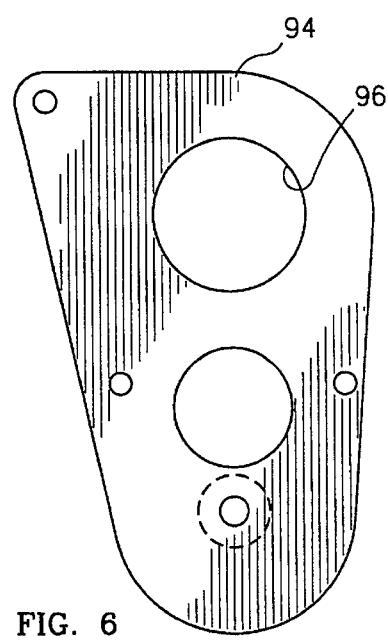
FIG. 6 is a sectional view taken substantially on the line 6—6 of FIG. 5 and shows a takeup arm in the gear shifter for holding the chain in a taut relationship with the sprocket for different gear relationships with the sprocket.

The drive motor 80 is disposed within the sleeve 88 and the sleeve is disposed within the shaft 58 (FIGS. 3, 5 and 7). The retaining ring 77 (FIG. 3) is disposed on the yoke 72 to retain the yoke on a spool 90. The spool 90 has a hole 92 through which the hollow shaft 58 extends (FIGS. 5 and 7). The spool 90 supports a takeup arm 94 which is provided with a hole 96 for receiving the spool.

A torsion spring 98 (FIGS. 3, 5 and 7) is disposed on the spool 90 within the hole 96. The spring 98 is attached at one end to the takeup arm 94 and at the other end to the spool 90. The takeup arm 94 is defined by a pair of spaced and parallel plates 100. A first additional sprocket or gear 102 and a second additional sprocket are gear 104 are disposed between the plates 100. The chain 28 extends in a closed loop around the additional sprockets or gears 102 and 104 and around an individual one of the sprockets or gears 30–42 (even numbers only) and around the first sprocket 20.

A flexible elastomeric bellows 106 having a plurality of convolutions seals the area between the support 46 and the spool 90 to prevent dirt from entering into the area of the internal movable components. The bellows 106 may be attached to the spool 90 by using a stretch fit over the outside of the spool or by clamping the bellows in place with a hose clamp (not shown). The bellows 106 may be attached to the support 46 by a washer 108 inserted inside the last convolution of the bellows. A shoulder 110 on the shaft 58 is pressed against the washer 108, which then presses the last corrugation of the bellows against the support 46. The force for pressing the corrugation of the bellows 106 against the support 46 is developed by tightening the screw 60 into the shaft 58.

The bellows 106 and the spool 90 amy be considered as encasing means.

When individual ones of the switches 11 (FIG. 1) are actuated, this causes electrical signals to be sent to the microprocessor controller 13 which then sends electric power through the ribbon 82 to the drive motor 80. The drive motor 80 then rotates the screw 78 in a direction dependent upon the signal produced by the microprocessor controller 13. The yoke 72 is driven linearly by the screw 78 in a particular direction which is restricted by the cuts 74 in the shaft 58. This particular direction corresponds to the direction defined by a line 114 in FIGS. 5 and 7 with arrows at the opposite ends of the line. This line is in a direction common to that defined by the peripheries of the gears 30–42 (even numbers only).

The movement of the yoke 72 linearly in the particular direction corresponding to the line 114 in FIGS. 5 and 7 produces a corresponding movement of the spool 90 linearly in the particular direction. The spool 90 drives the takeup arm 94. This causes the takeup arm 94 to move the additional sprockets or gears 102 and 104 and the chain 28 into alignment with an individual one of the sprockets or gears 30–42 (even numbers only). The chain 28 then extends in a closed loop around the sprocket 20, the individual one of the sprockets or gears 30–42 (even numbers only) and the additional sprockets or gears 102 and 104. The rear wheel 18 then rotates at a speed dependent upon the rotary speed of the first sprocket 20 and upon the gear ratio between the first sprocket and the individual one of the sprockets are gears.

It has been determined and appreciated through the years that a cyclist is generally most comfortable and most efficient, particularly over an extended period of time, when the cyclist is able to pedal the first sprocket 20 so that the sprocket rotates within particular limits of rotary speed. The cyclist actuates individual ones of the switches 11 to move the additional sprockets or gears 102 and 104 and the chain 28 into alignment with an individual one of the sprockets or gears 30–42 (even numbers only) when he desires to continue to rotate the sprocket 20 within the particular limits.

When the cyclist shifts gears, the chain continues to extend in a taut relationship around the sprocket 20, the individual one of the sprockets or gears 30–42 (even numbers only) and the additional sprockets or gears 102 and 104. This results from the action of the torsion spring 98 (FIGS. 3, 5 and 7) in pivoting the takeup arm 100 and the additional sprockets or gears 102 and 104 in accordance with the linear movement of the takeup arm in the particular direction defined by the line 114 in FIGS. 5 and 7. In this way, the taut relationship of the chain 28 around the individual one of the sprockets or gears 30–42 (even numbers only) and the additional sprockets or gears 102 and 104 is maintained. As will be appreciated, the chain 28 will slip when the sprocket 20 is rotated if the chain is not maintained in a taut relationship around the sprocket 20 and the sprockets or gears 30–42 (even numbers only).

As previously described, the shifting of the additional gears 102 and 104 into coupled relationship with individual ones of the sprockets or gears 30–42 (even numbers only) may be by a manual operation of the switches 11. Alternatively, the shifting of the additional sprockets or gears 102 and 104 may be performed automatically in a first direction when the speed of rotation of the first sprocket 20 rises above a particular maximum limit. Similarly, the shifting of the additional sockets or gears 102 and 104 may be performed automatically in an opposite direction when the speed of rotation of the first sprocket 20 falls below a particular minimum limit. The particular maximum and minimum limits may be adjusted by the cyclist to any desired and comfortable values. Such an automatically operative system is disclosed and claimed by me in application Ser. No. 07/772,163 filed by me on Oct. 7, 1991, for "Control System for Adjusting Bicycle Gear Ratios".

It may be sometimes desired to obtain access to the rear wheel 18 and the sprockets or gears 30–42 (even numbers only) for purposes of maintenance or repair of the bicycle 10 and particularly the rear wheel 18 and the sprockets or gears 30–42 (even numbers only). When it is desired to do this, the bolt 50 (FIGS. 2, 4 and 8) and the nut 52 are loosened. The support 46 is then able to be pivoted on the bolt 54 as a fulcrum so that the rear wheel 18 and the gears 30–42 (even numbers only) are exposed. This position is shown in FIG. 8. After the repair and maintenance have been completed, the support 46 is pivoted on the bolt 54 into position and the nut 52 is tightened on the bolt 50.

The gear shifter 12 described above has certain important advantages. It is rigidly supported by the bicycle frame 14. It is durable and this makes the gear shifter 12 particularly advantageous for use in mountain cycling. It is quite compact and does not extend very far from the bicycle frame 14. Because of this, it does not interfere with the operation of the bicycle 10 by the cyclist and it particularly doesn't interfere with the rotation of the sprocket 20 by the cyclist. This is particularly true in view of the fact that the motor 80, the screw 78 and the yoke 72 are disposed within the members such as the shaft 58. The shaft 58, the bellows 66 and the spool 90 provide smooth and continuous surfaces which shield the cyclist from injury and prevent the cyclist's clothes from becoming enmeshed in moving parts. The shaft 58, the bellows 106 and the spool 90 also shield the motor 80, the screw 78 and the yoke 72 from the atmosphere. The disposition of the shaft 58, the bellows 106 and the spool 90 in enveloping relationship to the drive motor 80, the screw 78 and the yoke 72 also minimizes the length of the gear shifter 12 in the particular direction defined by the line 114 (FIGS. 5 and 7) since the rotation of the drive motor produces the linear motion of members enveloping the drive member.

The gear shifter 12 also has other important advantages. For example, it does not interfere with an easy and efficient maintenance and repair of the bicycle. Furthermore, the support 46 is rigidly secured to the frame 14 to maintain the support in alignment with the axes of the rear wheel 18 and the gears 30–42 (even numbers only). At the same time, the support 46 provides for a linear movement of the additional gears 102 and 104 and the chain 28 in the direction 114 corresponding to that defined by the peripheries of the gears 30–42 (even numbers only). This linear drive arrangement is desirable because the forces involved are balanced and independent of the particular gear selected. The arrangement is also desirable because the displacement of the load represented by such members as the takeup arm 94 and the additional gears 102 and 104 is directly proportional to the rotation of the drive screw 78.

Although this invention has been disclosed and illustrated with reference to particular embodiments, the principles involved are susceptible for use in numerous other embodiments which will be apparent to persons skilled in the art. The invention is, therefore, to be limited only as indicated by the scope of the appended claims.

I claim:

1. In combination for use in a bicycle having a frame and front and rear wheels and a first sprocket on the frame to maintain the rotary speed of the sprocket within particular limits, a plurality of sprockets each providing an individual sprocket ratio with the first sprocket and each having a periphery disposed on an imaginary line extending in a particular direction and connecting the periphery of such sprocket with the peripheries of the other sprockets in the plurality, an additional sprocket movable in the particular direction relative to the sprockets in the plurality for alignment with the individual ones of the sprockets in the plurality, first means for coupling the additional sprocket to the bicycle frame, second means for providing a displacement of the additional sprocket in the particular direction to align the additional sprocket with individual ones of the sprockets in the plurality, third means for coupling the additional sprocket to the individual ones of the sprockets in the plurality in accordance with the linear displacement of the additional sprocket in the particular direction, and fourth means for shielding the additional sprocket from the atmosphere.

2. In a combination as recited in claim 1, the third means including a chain extending over the sprocket and the individual ones of the gears in the plurality and the additional gear.

3. In combination for use in a bicycle having a frame and front and rear wheels and a first sprocket on the frame to maintain the rotary speed of the sprocket within particular limits, a plurality of sprockets each providing an individual ratio with the first sprocket and each having a periphery displaced on the bicycle in a particular direction from the peripheries of the other sprockets in the plurality, an additional sprocket movable in the particular direction relative to the gears in the plurality for alignment with the individual ones of the sprockets in the plurality, first means for coupling the additional sprocket to the bicycle frame, second means for providing a displacement of the additional sprocket in the particular direction to align the additional sprocket with individual ones of the gears in the plurality, and third means for coupling the additional sprocket to the individual ones of the sprockets in the plurality in accordance with the linear displacement of the additional sprocket in the particular direction, takeup means for receiving the additional sprocket, the takeup means being displaceable in the particular direction and providing a displacement in the additional sprocket with the takeup means, and fourth means included in the takeup means for pivoting the takeup means and the additional sprocket in accordance with the movement of the takeup means and the additional sprocket in the particular direction to eliminate any slack in the third means as a result of the coupling of the third means to the individual sprockets in the plurality.

4. In combination for use in a bicycle having a frame and front and rear wheels and a first sprocket on the frame to maintain the rotary speed of the sprocket within particular limits, a plurality of sprockets each providing an individual sprocket ratio with the first sprocket and each having a periphery disposed on an imaginary line extending in a particular direction and connecting the periphery of such sprocket with the peripheries of the other sprockets in the plurality, an additional sprocket movable in the particular direction relative to the sprockets in the plurality for alignment with the individual ones of the sprockets in the plurality, first means for coupling the additional sprocket to the bicycle frame, second means for providing a displacement of the additional sprocket in the particular direction to align the additional sprocket with the individual ones of the sprockets in the plurality, third means for coupling the additional sprocket to the individual ones of the sprockets in the plurality in accordance with the linear displacement of the additional sprocket in the particular direction, and means for shielding the second means from the atmosphere.

5. In combination for use in a bicycle having a frame and front and rear wheels and a first sprocket on the frame to maintain the speed of the first sprocket within particular limits, a plurality of sprockets each operative to provide an individual sprocket ratio relative to the first sprocket, the peripheries of the sprockets in the plurality defining an imaginary line extending in a particular direction and connecting such sprockets, a first additional sprocket movable linearly in the particular direction to provide a coupling at each instant of the first additional sprocket with an individual one of the sprockets in the plurality in accordance with the linear movement of the additional sprocket in the particular direction, a second additional sprocket movable linearly with the first additional sprocket in the particular direction, a chain extending at each instant in a closed loop around, the first and second additional sprockets and the individual one of the sprockets in the plurality, first means for moving the first and second additional sprockets and the chain linearly in the particular direction to provide a coupling of the first and second additional sprockets and the chain to the individual ones of the sprockets in the plurality, and second means responsive to the movements of the first and second additional sprockets and the chain linearly in the particular direction for pivoting the first and second additional sprockets at each instant to compensate for the diameter of the individual sprocket in the plurality to which the first and second additional sprockets are coupled by the chain.

6. In a combination as set forth in claim 5, support means coupled to the frame, and the first means being operatively coupled to the first and second additional gears and the chain for providing a movement of the first and second additional gears and the chain relative to the frame linearly in the particular direction through a distance dependent upon the desired coupling at each instant between the first and second additional gears and the chain and the individual one of the gears in the plurality.

7. In a combination as set forth in claim 6, means included in the second means for repositioning the second means in a direction transverse to the particular direction in accordance with the coupling between the first and second additional sprockets and the chain and the individual one of the sprockets in the plurality to eliminate any slack in the chain.

8. In combination for use in a bicycle having a frame and front and rear wheels and a first sprocket on the frame to maintain the speed of the first sprocket within particular limits, a plurality of sprockets each operative to provide an individual sprocket ratio relative to the first sprocket, the peripheries of the sprockets in the plurality defining an imaginary line extending in a particular direction and connecting such sprockets, a first additional sprocket movable linearly in the particular direction to provide a coupling at each instant with an individual one of the sprockets in the plurality in accordance with the linear movement of the additional sprocket in the particular direction, a second additional sprocket movable linearly with the first additional sprocket in the particular direction, a chain extending at each instant in a closed loop around the first and second additional sprockets and the individual one of the sprockets in the plurality, first means for moving the first and second additional sprockets and the chain linearly in the particular direction to provide a coupling of the first and second additional sprockets and the chain to the individual ones of the sprockets in the plurality, second means for holding the first and second additional sprockets at each instant in a relationship to compensate for the diameter of the individual one of the sprockets in the plurality to which the first additional sprocket is coupled by the chain, the second means including a torsion spring responsive to the movements of the first and second additional sprockets and the chain linearly in the particular direction for operating upon the first and second additional sprockets to eliminate any slack in the chain as a result of the coupling of the first and second additional gears and the chain to the individual ones of the gears in the plurality.

9. In combination for use in a bicycle having a frame and front and rear wheels and a first sprocket on the frame to maintain the speed of the first sprocket within particular limits, a plurality of sprockets each operative to provide an individual sprocket ratio relative to the first sprocket, the peripheries of the sprockets in the plurality defining an imaginary line extending in a particular direction and connecting such sprockets, a first additional sprocket movable linearly in the particular direction to provide a coupling at each instant with an individual one of the sprockets in the plurality in accordance with the linear movement of the additional sprocket in the particular direction, a second additional sprocket movable linearly with the first additional sprocket in the particular direction, a chain extending at each instant in a closed loop around the first and second additional sprockets and the individual one of the sprockets in the plurality, first means for moving the first and second additional sprockets and the chain linearly in the particular direction to provide a coupling of the first and second additional sprockets and the chain to the individual ones of the sprockets in the plurality, second means for holding the first and second additional sprockets at each instant in a relationship to compensate for the diameter of the individual one of the sprockets in the plurality to which the first additional sprocket is coupled by the chain, the second means being pivotable to eliminate any slack in the chain as a result of the coupling of the first and second additional gears and the chain to the individual ones of the gears in the plurality, the first means including a drive motor and a screw driven by the drive motor and a yoke driven by the screw and coupled to the first and second additional sprockets and the chain to move the first and second additional sprockets and the chain in the particular direction.

10. In combination for use in a bicycle having a frame and front and rear wheels and a first sprocket on the frame to maintain the rotary speed of the sprocket within particular limits, a plurality of sprockets each providing an individual sprocket ratio relative to the first sprocket and each having a periphery disposed on an imaginary line extending in a particular direction and connecting the periphery of such sprocket with the peripheries of the other sprockets in the plurality, an additional sprocket movable linearly in the particular direction through distances for alignment with the different sprockets in the plurality, first means including a motor for providing a linear movement of the additional sprocket through a distance in the particular direction to become aligned with an individual one of the sprockets in the plurality, a chain extending in a closed loop around the individual one of the sprockets in the plurality and the additional sprocket to drive the individual one of the sprockets in the plurality and the additional sprocket in accordance with the rotation of the first sprocket, and second means operatively coupled to the additional sprocket and responsive to the linear movement of the additional sprocket by the motor in the particular direction for adjusting the position of the additional sprocket in the aligned relationship with the individual one of the sprockets in the plurality to eliminate any slack in the chain as a result of such linear movement.

11. In combination for use in a bicycle having a frame and front and rear wheels and a first sprocket on the frame to maintain the rotary speed of the first sprocket within particular limits, a plurality of sprockets each providing an individual sprocket ratio relative to the first sprocket and each having a periphery disposed on an imaginary line extending in a particular direction and connecting the periphery of such sprocket with the peripheries of the other sprockets in the plurality, an additional sprocket movable linearly in the particular direction through distances for alignment with the different sprockets in the plurality, first means for providing a linear movement of the additional sprocket through a distance in the particular direction to become aligned with an individual one of the sprockets in the plurality, a chain extending in a closed loop around the individual one of the sprockets in the plurality and the additional sprocket to drive the individual one of the sprockets in the plurality and the additional sprocket in accordance with the rotation of the first sprocket, and second means operatively coupled to the additional sprocket for adjusting the position of the additional sprocket in the aligned relationship with the individual one of the sprockets in the plurality to eliminate any slack in the chain, a second additional gear movable linearly in the particular direction with the first additional gear for alignment with the first additional gear, the second means including a takeup arm for holding the first and second additional sprockets in alignment with the individual one of the sprockets in the plurality, the second means including means responsive to the linear movement of the additional sprockets in the particular direction for adjusting the rotational positioning of the takeup arm to eliminate any slack in the chain upon the alignment of the first and second additional sprockets with the individual one of the sprockets in the plurality.

12. In combination for use in a bicycle having a frame and front and rear wheels and a first sprocket on the frame to maintain the rotary speed of the sprocket within particular limits, a plurality of sprockets each providing an individual sprocket ratio relative to the first sprocket and each having a periphery disposed on an imaginary line extending in a particular direction and connecting the periphery of such sprocket with the peripheries of the other sprockets in the plurality, an additional sprocket movable linearly in the particular direction through distances for alignment with the different sprockets in the plurality, first means for providing a linear movement of the additional sprocket through a distance in the particular direction to become aligned with an individual one of the sprockets in the plurality, a chain extending in a closed loop around the individual one of the sprockets in the plurality and the additional sprocket to drive the individual one of the sprockets in the plurality and the additional sprocket in accordance with the rotation of the first sprocket, second means operatively coupled to the additional sprocket for adjusting the position of the additional sprocket in the aligned relationship with the individual one of the sprockets in the plurality to eliminate any slack in the chain, a second additional sprocket movable linearly in the particular direction with the first additional sprocket for alignment with the first additional sprocket, the second means including a takeup arm for holding the first and second additional sprockets in alignment with the individual one of the sprockets in the plurality, the second means including third means operative to adjust the positioning of the takeup arm to eliminate any slack in the chain after the alignment of the first and second additional sprockets with the individual one of the sprockets in the plurality, and third means for shielding the first means from the atmosphere regardless of the alignment of the additional sprocket with any of the sprockets in the plurality.

13. In combination for use in a bicycle having a frame and front and rear wheels and a first sprocket on the frame to maintain the rotary speed of the sprocket within particular limits, a plurality of sprockets each providing an individual sprocket ratio relative to the first sprocket and each having a periphery disposed on an imaginary line extending in a particular direction and connecting the periphery of such sprocket with the peripheries of the other sprockets in the plurality, an additional sprocket movable linearly in the particular direction through distances for alignment with the different sprockets in the plurality, first means for providing a linear movement of the additional sprocket through a distance in the particular direction to become aligned with an individual one of the sprockets in the plurality, a chain extending in a closed loop around the individual one of the sprockets in the plurality and the additional sprocket to drive the individual one of the sprockets in the plurality and the additional sprocket in accordance with the rotation of the first sprocket, a second additional sprocket movable linearly in the particular direction with the first additional sprocket for alignment with the first additional sprocket, second means including a takeup arm for holding the first and second additional gears in alignment with the individual one of the sprockets in the plurality, the second means including means operative to adjust the positioning of the takeup arm to eliminate any slack in the chain after the alignment of the first and second additional sprockets with the individual one of the sprockets in the plurality, and encasing means, the first means being contractible and expandable within the encasing means to provide for the linear movement of the additional sprocket in the particular direction.

14. In combination for use in a bicycle having a frame and front and rear wheels and a first sprocket on the frame to maintain the rotary speed of the sprocket within particular limits, a plurality of sprockets disposed on an imaginary line extending in a particular direction and connecting the periphery of such sprocket with the peripheries of the other sprockets in the plurality, each of the sprockets having an individual ratio relative to the first sprocket, the plurality of sprockets being operatively coupled to the rear wheel, a drive motor disposed in the particular direction, a screw disposed in the particular direction and rotatable by the drive motor, a yoke disposed on the screw for linear movement in the particular direction in accordance with the rotation of the screw by the drive motor, sprocket means movable linearly with the yoke in the particular direction for alignment with an individual one of the sprockets in the plurality, and a chain disposed around the sprocket means and the individual one of the sprockets in the plurality for driving the individual one of the sprockets in the plurality in accordance with the rotation of the first sprocket.

15. In a combination as set forth in claim 14, means for shielding the motor, the screw and the yoke from the atmosphere.

16. In a combination as set forth in claim 14, a bellows disposed in the particular direction and attached to the yoke for contraction and expansion in the particular direction in accordance with the movement of the yoke in the particular direction, and means operatively coupled to the sprocket means for driving the sprocket means in the particular direction in accordance with the movement of the yoke in the particular direction.

17. In a combination as set forth in claim 14, means for holding the sprocket means and for providing for an adjustment in the positioning of the sprocket means, while maintaining the sprocket means in aligned relationship with the individual one of the sprockets in the plurality, to eliminate any slack in the chain.

18. In a combination as set forth in claim 14, means covering the yoke and expansible and contractible in accordance with the movement of the yoke in the particular direction.

19. In combination for use in a bicycle having a frame and front and rear wheels and a first sprocket on the frame to maintain the rotary speed of the sprocket within particular limits, a plurality of sprockets attached to the frame at the position of the attachment of the rear wheel of the bicycle, each of the sprockets in the plurality having an individual ratio relative to the first sprocket, the peripheries of the sprockets in the plurality being disposed on an imaginary line extending in a particular direction, a support, first means for attaching the support to the frame at the position of attachment of the rear wheel and the sprockets in the plurality to the frame, second means for attaching the support to the frame at a position displaced from the first means for providing a rotary displacement of the support at the displaced position as a fulcrum from a position blocking access to the rear wheel and the sprockets in the plurality upon the removal of the first means from attachment of the support to the frame, an additional sprocket movable in the particular direction for alignment with an individual one of the sprockets in the plurality, and a chain extending in a closed loop around the individual one of the sprockets in the plurality and the additional sprocket to rotate the rear wheel in accordance with the rotation of the sprocket and in accordance with the sprocket ratio between the individual one of the sprockets in the plurality and the sprocket.

20. In a combination as set forth in claim 19, a motor, a screw extending from the motor in the particular direction for rotation in accordance with the operation of the motor, a yoke disposed on the screw for movement in the particular direction in accordance with the rotation of the screw, means operatively coupled to the yoke for confining the yoke to movement in the particular direction, and means operatively coupled to the yoke for producing a movement of the additional gear in the particular direction in accordance with the movement of the yoke in the particular direction.

21. In combination for use in a bicycle having a frame and front and rear wheels and a first sprocket on the frame to maintain the rotary speed of the sprocket within particular limits, a plurality of sprockets attached to the frame at the position of the attachment of the rear wheel of the bicycle, each of the sprockets in the plurality having an individual ratio relative to the first sprocket, the peripheries of the sprockets in the plurality being disposed on an imaginary line extending in a particular direction, a support, first means for attaching the support to the frame at the position of attachment of the rear wheel and the sprockets in the plurality to the frame, second means for attaching the support to the frame at a position displaced from the first means for providing a rotary displacement of the support at the displaced position as a fulcrum from a position blocking access to the rear wheel and the sprockets in the plurality upon the removal of the first means from attachment of the support to the frame, an additional sprocket movable in the particular direction for alignment with an individual one of the sprockets in the plurality, and a chain extending in a closed loop around the individual one of the sprockets in the plurality and the additional sprocket to rotate the rear wheel in accordance with the rotation of the first sprocket and in accordance with the sprocket ratio between the individual one of the sprockets in the plurality and the first sprocket, and means movable in the particular direction for displacing the additional sprocket in the particular direction in accordance with such movement.

22. In a combination as set forth in claim 21, a motor, the movable means including a motor, a screw rotatable in accordance with the operation of the motor and a yoke disposed on the screw for linear movement in the particular direction in accordance with the rotation of the screw and also including a bellows coupled to the yoke and the additional sprocket for expansion and contraction in the particular direction in accordance with the linear movement of the yoke and for moving the additional sprocket in the particular direction in accordance with such expansion and contraction.

23. In a combination as set forth in claim 22, the movable means including controller means responsive to a desired displacement of the additional sprocket and to the operation of the motor for providing a continued operation of the motor to move the additional sprocket into alignment with the individual one of the sprockets in the plurality.

24. In combination for use in a bicycle having a frame and front and rear wheels and a first sprocket on the frame to maintain the rotary speed of the first sprocket within particular limits, a plurality of sprockets attached to the frame at the position of the attachment of the rear wheel of the bicycle, each of the sprockets in the plurality having an individual ratio relative to the first sprocket, the peripheries of the sprockets in the plurality being disposed on an imaginary line extending in a particular direction, a support, first means for attaching the support to the frame at the position of attachment of the rear wheel and the sprockets in the plurality to the frame, second means for attaching the support to the frame at a position displaced from the first means for providing a rotary displacement of the support at the displaced position as a fulcrum from a position blocking access to the rear wheel and the sprockets in the plurality upon the removal of the first means from attachment of the support to the frame, an additional sprocket movable in the particular direction for alignment with an individual one of the sprockets in the plurality, a chain extending in a closed loop around the individual one of the sprockets in the plurality and the additional sprocket to rotate the rear wheel in accordance with the rotation of the first sprocket and in accordance with the sprocket ratio between the individual one of the sprockets in the plurality and the first sprocket, means movable in the particular direction for displacing the additional sprocket in the particular direction in accordance with such movement, and means operatively coupled to the movable means for preventing the movable means from rotating during the displacement of the additional sprocket in the particular direction.

25. In combination for use in a bicycle having a frame and front and rear wheels and a first sprocket on the frame to maintain the rotary speed of the sprocket within particular limits, a plurality of sprockets each attached to the rear wheel in an axial direction corresponding to the axis of the rear wheel and each having an individual sprocket ratio relative to the first socket, the peripheries of the sprockets in the plurality being disposed on an imaginary line extending in a particular direction angularly displaced from the axial direction, support means, first means for attaching the support means to the frame at the axial position, and an additional sprocket displaced from the individual sprockets in the plurality in a direction substantially perpendicular to the axis of the rear wheel, second means extending from the support means in the particular direction for displacing the additional sprocket linearly in the particular direction to a position in alignment with an individual one of the sprockets in the plurality, and a chain extending around the individual one of the sprockets in the plurality and the additional sprocket to drive the rear wheel at a speed dependent upon the rotary speed of the first sprocket and the sprocket ratio of the individual one of the sprockets in the plurality relative to the first sprocket, the support means having a first end and a second end, the first means attaching the support means to the frame at the first end of the support means and the second means extending from the support means at the second end of the support means, the first means attaching the support means to the frame at a pair of spaced positions one being the axial position and the other being a position displaced from the axial position, the support means being pivotable relative to the frame about the other position, upon the detachment of the first means from the frame at the axial position, to provide for access to the frame and the rear wheel.

26. In combination for use in a bicycle having a frame and front and rear wheels and a first sprocket on the frame to maintain the rotary speed of the sprocket within particular limits, a plurality of sprockets each attached to the rear wheel in an axial direction corresponding to the axis of the rear wheel and each having an individual sprocket ratio relative to the first sprocket, the peripheries of the sprockets in the plurality being disposed or an imaginary line extending in a particular direction angularly displaced from the axial direction, support means, first means for attaching the support means to the frame at the axial position, and an additional sprocket displaced from the individual sprockets in the plurality in a direction substantially perpendicular to the axis of the rear wheel, second means extending from the support means in the particular direction for displacing the additional sprocket linearly in the particular direction to a position in alignment with an individual one of the sprockets in the plurality, a chain extending around the individual one of the sprockets in the plurality and the additional sprocket to drive the rear wheel at a speed dependent upon the rotary speed of the first sprocket and the sprocket ratio of the individual one of the sprockets in the plurality relative to the first sprocket, and means for shielding the from the atmosphere.

27. In combination for use in a bicycle having a frame and front and rear wheels and a first sprocket in the frame to maintain the rotary speed of the sprocket within particular limits, a plurality of sprockets each providing an individual sprocket ratio relative to the first sprocket and each having a common axis with the other sprockets in the plurality and with the rear wheel of the bicycle and each attached to the rear wheel of the bicycle at the common axis and each having a periphery disposed on an imaginary line extending in a particular direction and connecting the periphery of such sprocket with the peripheries of the other sprockets in the plurality, support means having a first end attached to the frame at the common axis and having a second end displaced from the axis, contractible means having first and second ends, first means for attaching the first end of the contractible means to the second end of the support means, second means for providing a movement of the second end of the contractible means in the particular direction, an additional sprocket movable with the second end of the contractible means in the particular direction, and a chain extending around the additional sprocket in the plurality and an individual one of the sprockets dependent upon the positioning of the additional sprocket in the particular direction for driving the individual one of the sprockets in the plurality and the rear wheel of the bicycle at a speed dependent upon the rotary speed of the first sprocket and the sprocket ratio between the first sprocket and the individual one of the sprockets in the plurality.

28. In a combination as set forth in claim 27, a drive motor, a lead screw coupled to the drive motor for rotation in accordance with the operation of the motor, and third means including a yoke disposed on the lead screw and coupled to the second end of the contractible means for moving the second end of the collapsible means in the particular direction in accordance with the rotation of the lead screw.

29. In a combination as recited in claim 27, the additional sprocket constituting a first additional, a second additional sprocket, third means for holding the first and second additional sprocket in a plane substantially parallel to the planes defined by the rear wheel of the bicycle and the sprockets in the plurality, and the chain extending around the individual one of the sprockets in the plurality and the first and second additional sprockets to drive the individual one of the sprockets in the plurality in accordance with the rotation of the first sprocket.

30. In a combination as set forth in claim 27, third means for eliminating any slack in the chain upon a movement of the chain in the particular direction to the individual one of the sprockets in the plurality in accordance with the contraction of the contractible means.

31. In a combination as set forth in claim 29, third means for eliminating any slack in the chain upon a movement of the chain in the particular direction to the individual one of the sprockets in the plurality in accordance with the contraction of the contractible means, and fourth means including the contractible means for shielding the first and second additional sprockets and the chain from the atmosphere.

32. In a combination as set forth in claim 31, sixth means for providing an attachment of the support means to the frame at a position displaced from the common axis, the sixth means being disposed to provide for a pivotal movement of the support from a position blocking access to the rear wheel and the sprockets in the plurality upon a detachment of the first means from the frame.

33. In a combination for use in a bicycle, a frame, a first sprocket attached to the frame, a rear wheel having an axis and attached to the frame at the axis of the wheel, a plurality of sprockets each having an axis and each attached to the rear wheel at its axis, each of the sprockets in the plurality having an individual sprocket ratio relative to the first sprocket and having a periphery disposed on an imaginary line extending in a particular direction and connecting the periphery of such sprocket with the peripheries of the other sprockets in the plurality and having a disposition substantially parallel to the rear wheel, support means having a first end attached to the frame at the axis of the wheel, the support means having a second end, an additional sprocket disposed in a direction substantially parallel to the rear wheel, first means operatively coupled to the second end of the support means and to the additional sprocket for moving the additional sprocket linearly in the particular direction to a position for alignment with an individual one of the sprockets in the plurality, a chain extending around the additional sprocket and the individual one of the sprockets in the plurality, and means disposed in co-operative relationship with the first means for preventing the first means from rotating during the movement of the additional sprocket in the particular direction.

34. In a combination as set forth in claim 33, the first means including a motor for driving the first and second additional sprockets in the particular direction and for producing first signals in accordance with the displacement of the first and second additional sprockets in the particular direction and including controller means for producing second signals representing the desired displacement of the first and second additional sprockets in the particular direction and for producing an operation of the motor in accordance with the relative characteristics of the first and second signals.

35. In a combination for use in a bicycle, a frame, a first sprocket attached to the frame, a rear wheel having an axis and attached to the frame at the axis of the wheel, a plurality of sprockets each having an axis and each attached to the rear wheel at its axis, each of the sprockets in the plurality having an individual sprocket ratio relative to the first sprocket and having a periphery disposed on an imaginary line extending in a particular direction relative to the peripheries of the other sprockets in the plurality and having a disposition substantially parallel to the rear wheel, support means having a first end attached to the frame at the axis of the wheel, the support means having a second end, an additional sprocket disposed in a direction substantially parallel to the rear wheel, first means operatively coupled to the second end of the support means and to the additional sprocket for moving the additional sprocket linearly in the particular direction to a position for alignment with an individual one of the sprockets in the plurality, and a chain extending around the additional sprocket and the individual one of the sprockets in the plurality, the first means including a motor disposed in the particular direction and including a lead screw disposed in the particular direction and including a yoke disposed on the screw for linear movement in the particular direction in accordance with the rotation of the screw and including second means for moving the additional sprocket linearly in the particular direction in accordance with the linear movement of the yoke in the particular direction.

36. In a combination for use in a bicycle, a frame, a first sprocket attached to the frame, a rear wheel having an axis and attached to the frame at the axis of the wheel, a plurality of sprockets each having an axis and each attached to the rear wheel at its axis, each of the sprockets in the plurality having an individual sprocket ratio relative to the first sprocket and having a periphery disposed on an imaginary line extending in a particular direction relative to the peripheries of the other sprockets in the plurality and having a disposition substantially parallel to the rear wheel, support means having a first end attached to the frame at the axis of the wheel, the support means having a second end, an additional sprocket disposed in a direction substantially parallel to the rear wheel, first means operatively coupled to the second end of the support means and to the additional sprocket for moving the additional sprocket linearly in the particular direction to a position for alignment with an individual one of the sprockets in the plurality, a chain extending around, the additional sprocket and the individual one of the sprockets in the plurality, takeup means for holding the additional sprocket, the take-up means being movable in the particular direction with the additional sprocket, and means responsive to the movement of the additional sprocket and the take-up means in the particular direction for pivoting the takeup means to eliminate any slack in the chain when the additional sprocket is moved into alignment with the individual one of the sprockets in the plurality.

37. In combination for use in a bicycle, a frame, a bicycle wheel attached to the frame for rotary movement relative to the frame, a first sprocket attached to the frame for rotary movement relative to the frame, a plurality of sprockets attached to the rear wheel at a position displaced from the first sprocket for rotary movement relative to the frame and for driving the wheel, the sprockets in the plurality having individual sprocket ratios relative to the first sprocket and having individual diameters in accordance with such sprocket ratios, the individual diameters of the sprockets in the plurality defining an imaginary line extending in a particular direction and connecting the sprockets at the peripheries of the sprockets, an additional sprocket movable linearly in the particular direction for an aligned relationship with the individual sprockets in the plurality, means for coupling the additional sprocket to the frame for movement linearly in the particular direction, means for moving the additional sprocket linearly in the particular direction, a chain coupling, an individual one of the sprockets in the plurality and the additional sprocket for rotating the individual one of the sprockets in the plurality in accordance with the rotation of the first sprocket, and means for preventing the coupling means from rotating during the movement of the additional sprocket linearly in the particular direction.

38. In a combination as set forth in claim 37, support means, the sprockets in the plurality and the rear wheel having a common axis, the first particular direction being transverse with respect to the axes of the sprockets in the plurality and the axis of the wheel, the sprockets in the plurality and the wheel being attached to the frame at their common axial positions, takeup means for supporting the first and second additional sprockets, and first attachment means for attaching the support means to the frame at the common axes of the sprockets in the plurality and the wheel.

39. In combination for use in a bicycle, a frame, a bicycle wheel attached to the frame for rotary movement relative to the frame, a first sprocket attached to the frame for rotary movement relative to the frame, a plurality of sprockets attached to the rear wheel at a position displaced from the first sprocket for rotary movement relative to the frame and for driving the wheel, the sprockets in the plurality having individual sprocket ratios relative to the first sprocket and having individual diameters in accordance with such sprocket ratios, the individual diameters of the sprockets in the plurality defining an imaginary line extending in a particular direction and connecting the sprockets at the peripheries of the sprockets, an additional sprocket movable linearly in the particular direction for an aligned relationship with the individual sprockets in the plurality, means for coupling the additional sprocket to the frame for movement linearly in the particular direction, means for moving the additional sprocket linearly in the particular direction, a chain coupling an individual one of the sprockets in the plurality and the additional sprocket for rotating the individual one of the sprockets in the plurality in accordance with the rotation of the first sprocket, and means for preventing the moving means from rotating during the movement of the additional sprocket linearly in the particular direction, the additional sprocket constituting a first additional sprocket, means including a second additional sprocket and a torsion spring disposed relative to the first and second additional sprockets for maintaining tension in the chain regardless of the individual one of the sprockets in the plurality to which the first additional sprocket is coupled by the chain.

40. In combination for use in a bicycle, a frame, support means, a bicycle wheel attached to the frame for rotary movement relative to the frame, a first sprocket attached to the frame for rotary movement relative to the frame, a plurality of sprockets attached to the rear wheel at a position displaced from the first sprocket for rotary movement relative to the frame and for driving the wheel, the sprockets in the plurality having individual sprocket ratios relative to the first sprocket and having individual diameters in accordance with such sprocket ratios, the individual diameters of the sprockets in the plurality defining an imaginary line extending in a particular direction and connecting the sprockets at the peripheries of the sprockets, an additional sprocket movable linearly in the particular direction for an aligned relationship with the individual sprockets in the plurality, means for coupling the additional sprocket to the frame for movement linearly in the particular direction, means for moving the additional sprocket linearly in the particular direction, a chain coupling the first sprocket, an individual one of the sprockets in the plurality and the additional sprocket for rotating the individual one of the sprockets in the plurality in accordance with the rotation of the first sprocket, the sprockets in the plurality and the rear wheel having a common axis, the first particular direction being transverse with respect to the axes of the sprockets in the plurality and the axis of the wheel, the sprockets in the plurality and the wheel being attached to the frame at their common axial positions, takeup means for supporting the first and second additional sprockets, and first attachment means for attaching the support means to the frame at the common axes of the sprockets in the plurality and the rear wheel, and second attachment means for attaching the support means to the frame at a position displaced from the common axes of the sprockets in the plurality and the rear wheel to provide for a pivotal movement of the support means relative to the frame when the first attachment means is detached from the frame.

41. In a combination for use on a bicycle, a first sprocket having an axis, a frame, a wheel having an axis displaced from the axis of the sprocket and attached to the frame at the axis of the wheel, a plurality of sprockets each having an axis and each attached to the rear wheel at its axis and at the axis of the wheel and each having a different sprocket ratio relative to the first sprocket than the other sprockets in the plurality, an additional sprocket, support means for the additional sprocket, first means for coupling the support means to the frame at the axis of the wheel but with the additional sprocket substantially parallel with the sprockets in the plurality but displaced from the sprockets in the plurality in a direction substantially parallel to the sprockets in the plurality, second means for moving the additional sprocket in a linear direction into alignment with an individual one of the sprockets in the plurality but with the additional sprocket displaced from the individual one of the sprockets in the plurality in the direction substantially parallel to the sprockets in the plurality, a chain coupling the additional sprocket and the individual one of the sprockets in the plurality to drive the wheel in accordance with the rotation of the first sprocket and at a speed dependent upon the rotational speed of the first sprocket and the sprocket ratio between the individual one of the sprockets in the plurality and the first sprocket, and third means for preventing the second means from rotating during the movement of the additional sprocket in the linear direction.

42. In a combination for use on a bicycle, a first sprocket having an axis, a frame, a wheel having an axis displaced from the axis of the sprocket and attached to the frame at the axis of the wheel, a plurality of sprockets each having an axis and each attached to the rear wheel at its axis and at the axis of the wheel and each having a different sprocket ratio relative to the first sprocket than the other sprockets in the plurality, an additional sprocket, support means for the additional sprocket, first means for coupling the support means to the frame at the axis of the wheel but with the additional sprocket substantially parallel with the sprockets in the plurality but displaced from the sprockets in the plurality in a direction substantially parallel to the sprockets in the plurality, second means for moving the additional sprocket in a linear direction into alignment with an individual one of the sprockets in the plurality but with the additional sprocket displaced from the individual one of the sprockets in the plurality in the direction substantially parallel to the sprockets in the plurality, a chain coupling the additional sprocket and the individual one of the sprockets in the plurality to drive the wheel in accordance with the rotation of the first sprocket and at a speed dependent upon the rotational speed of the first sprocket and the sprocket ratio between the individual one of the sprockets in the plurality and the sprocket, and third means for coupling the support means to the frame at a position displaced from the axis of the wheel to provide for a pivotal movement of the additional sprocket and the second means on the displaced position as a fulcrum, with the support means decoupled from the frame at the axis of the wheel, to provide for access to the wheel and the sprockets in the plurality.

43. In a combination for use on a bicycle, a first sprocket having an axis, a frame, a wheel having an axis displaced from the axis of the first sprocket and attached to the frame at the axis of the wheel, a plurality of sprockets each having an axis and each attached to the rear wheel at its axis and at the axis of the wheel and each having a different ratio relative to the first sprocket than the other sprockets in the plurality, an additional sprocket, support means for the additional sprocket, first means for coupling the support means to the frame at the axis of the wheel but with the additional sprocket substantially parallel with the sprockets in the plurality but displaced from the sprockets in the plurality in a direction substantially parallel to the sprockets in the plurality, second means for moving the additional sprocket in a linear direction into alignment with an individual one of the sprockets in the plurality but with the additional sprocket displaced from the individual one of the sprockets in the plurality in the direction substantially parallel to the sprockets in the plurality, a chain coupling the additional sprocket and the individual one of the sprockets in the plurality to drive the wheel in accordance with the rotation of the first sprocket and at a speed dependent upon the rotational speed of the first sprocket and the sprocket ratio between the individual one of the sprockets in the plurality and the first sprocket, and third means for shielding the additional chain and the sprocket from the atmosphere.

44. In a combination for use on a bicycle, a first sprocket having an axis, a frame, a wheel having an axis displaced from the axis of the first sprocket and attached to the frame at the axis of the wheel, a plurality of sprockets each having an axis and each attached to the rear wheel at its axis and at the axis of the wheel and each having a different ratio relative to the first sprocket than the other sprockets in the plurality, an additional sprocket, support means for the additional sprocket, first means for coupling the support means to the frame at the axis of the wheel but with the additional sprocket substantially parallel with the sprockets in the plurality but displaced from the sprockets in the plurality in a direction substantially parallel to the sprockets in the plurality, second means for moving the additional sprocket in a linear direction into alignment with an individual one of the sprockets in the plurality but with the additional sprocket displaced from the individual one of the sprockets in the plurality in the direction substantially parallel to the sprockets in the plurality, and a chain coupling the first sprocket, the additional sprocket and the individual one of the sprockets in the plurality to drive the wheel in accordance with the rotation of the first sprocket and at a speed dependent upon the rotational speed of the first sprocket and the sprocket ratio between the individual one of the sprockets in the plurality and the first sprocket, the second means including a drive motor, a screw rotatable by the drive motor and a yoke disposed on the screw for linear movement on the screw in accordance with the rotation of the screw and further including third means having first and second ends and operatively coupled to the support means at one end and operatively coupled to the yoke and the additional sprocket and the chain at the other end for moving the additional sprocket and the chain in the linear direction into alignment with the individual one of the sprockets in the plurality in accordance with the rotation of the screw.

45. In a combination as set forth in claim 44, the third means being expansible and contractible to move the additional gear and the chain in the linear direction into alignment with the individual one of the gears in the plurality, and fourth means including the third means for shielding the drive motor, the screw and the yoke.

46. In a combination as set forth in claim 44, fifth means for shielding the additional gear and the chain from the atmosphere.

47. In a combination as set forth in claim 46, the second means including controller means for providing first signals indicating the desired displacement of the additional gear in the particular direction and for receiving second signals indicating the actual displacement of the additional gear in the particular direction and for providing a displacement of the additional gear in the particular direction in accordance with any difference between the first and second signals.

48. In combination for use in a bicycle having a frame and front and rear wheels and a first sprocket on the frame to maintain the speed of the sprocket within particular limits, a plurality of sprockets each operative to provide an individual gear ratio relative to the first sprocket, the peripheries of the sprockets being displaced from one another in a particular direction, a first additional sprocket movable linearly in the particular direction to provide a coupling at each instant with an individual one of the sprockets in the plurality in accordance with the linear movement of the additional sprocket in the particular direction, a second additional sprocket movable linearly with the first additional sprocket in the particular direction, a chain extending at each instant in a closed loop around the first and second additional sprockets and the individual one of the sprockets in the plurality, first means for moving the first and second additional sprockets and the chain linearly in the particular direction to provide a coupling of the first and second additional sprockets and the chain to the individual ones of the gears in the plurality, second means for holding the first and second additional sprockets at each instant in a relationship to compensate for the diameter of the individual one of the sprockets in the plurality to which the first additional sprocket is coupled by the chain, the first means including a motor for driving the first and second additional sprockets in the particular direction and for producing first signals in accordance with the displacement of the first and second additional sprockets in the particular direction and including controller means for producing second signals representing the desired displacement of the first and second additional sprockets in the particular direction and for producing an operation of the motor in accordance with the relative characteristics of the first and second signals.

49. In combination for use in a bicycle having a frame and front and rear wheels and a sprocket on the frame to maintain the rotary speed of the sprocket within particular limits, a plurality of sprockets each attached to the rear wheel in an axial direction corresponding to the axis of the rear wheel and each having an individual sprocket ratio relative to the first socket, the peripheries of the sprockets in the plurality being disposed on an imaginary line extending in a particular direction angularly displaced from the axial direction, support means, first means for attaching the support means to the frame at the axial position, and an additional sprocket displaced from the individual sprockets in the plurality in a direction substantially perpendicular to the axis of the rear wheel, second means extending from the support means in the particular direction for displacing the additional sprocket linearly in the particular direction to a position in alignment with an individual one of the sprockets in the plurality, a chain extending around the individual one of the sprockets in the plurality and the additional sprocket to drive the rear wheel at a speed dependent upon the rotary speed of the first sprocket and the sprocket ratio of the individual one of the sprockets in the plurality relative to the sprocket, and means disposed in co-operative relationship with the second means for preventing the second means from rotating during the operation of the second means in displacing the additional sprocket linearly in the particular direction.

50. In a combination as set forth in claim 49, the second means including a motor for driving the additional sprocket in the particular direction and including means responsive to the operation of the motor and to the desired displacement of the additional sprocket in the particular direction for operating the motor to obtain the linear movement of the additional sprocket in the particular direction to the position in alignment with the individual one of the sprocket in the plurality.

51. In a combination as set forth in claim 49, the support means having a first end and a second end, the first means attaching the support means to the frame at the first end of the support means and the second means extending from the support means at the second end of the support means.

52. In combination for use in a bicycle having a frame and front and rear wheels and a first sprocket on the frame to maintain the rotary speed of the sprocket within particular limits, a plurality of sprockets each providing an individual sprocket ratio with the first sprocket and each having a periphery disposed on an imaginary line extending in a particular direction and connecting the periphery of such sprocket with the peripheries of the other sprockets in the plurality, an additional sprocket movable in the particular direction relative to the sprockets in the plurality for alignment with the individual ones of the sprockets in the plurality, first means for coupling the additional sprocket to the bicycle frame, second means for providing a displacement of the additional sprocket in the particular direction to align the additional sprocket with individual ones of the sprockets in the plurality, third means for coupling the additional sprocket to the individual ones of the sprockets in the plurality in accordance with the linear displacement of the additional sprocket in the particular direction, and fourth means included in the second means for preventing rotation of the second means during the operation of the second means in providing a displacement of the additional sprocket in the particular direction.

53. In combination for use in a bicycle having a frame and front and rear wheels and a first sprocket on the frame to maintain the speed of the first sprocket within particular limits, a plurality of sprockets each operative to provide an individual sprocket ratio relative to the first sprocket, the peripheries of the sprockets in the plurality defining an imaginary line extending in a particular direction and connecting such sprockets, a first additional sprocket movable linearly in the particular direction to provide a coupling at each instant with an individual one of the sprockets in the plurality in accordance with the linear movement of the first additional sprocket in the particular direction, a second additional sprocket movable linearly with the first additional sprocket in the particular direction, a chain extending at each instant in a closed loop around the first and second additional sprockets and the individual one of the sprockets in the plurality, first means for moving the first and second additional sprockets and the chain linearly in the particular direction to provide a coupling of the first and second additional sprockets and the chain to the individual ones of the sprockets in the plurality, second means for holding the first and second additional sprockets at each instant in a relationship to compensate for the diameter of the individual one of the sprockets in the plurality to which the first additional sprocket is coupled by the chain, and third means operatively coupled to the first means for preventing rotation of the first means during the operation of the first means in moving the first and second additional sprockets and the chain linearly in the particular direction.

54. In combination for use in a bicycle having a frame and front and rear wheels and a first sprocket on the frame to maintain the rotary speed of the sprocket within particular limits, a plurality of sprockets each providing an individual sprocket ratio relative to the first sprocket and each having a periphery disposed on an imaginary line extending in a particular direction and connecting the periphery of such sprocket with the peripheries of the other sprockets in the plurality, an additional sprocket movable linearly in the particular direction through distances for alignment with the different sprockets in the plurality, first means for providing a linear movement of the additional sprocket through a distance in the particular direction to become aligned with an individual one of the sprockets in the plurality, a chain extending in a closed loop around the individual one of the sprockets in the plurality and the additional sprocket to drive the individual one of the sprockets in the plurality and the additional sprocket in accordance with the rotation of the first sprocket, second means operatively coupled to the additional sprocket for adjusting the position of the additional sprocket in the aligned relationship with the individual one of the sprockets in the plurality to eliminate any slack in the chain, and third means operatively coupled to the first means for preventing the first means from rotating during the operation of the first means in providing the linear movement of the additional sprocket in the particular direction.

55. In a combination for use in a bicycle, a frame, a first sprocket attached to the frame, a rear wheel having an axis and attached to the frame at the axis of the wheel, a plurality of sprockets each having an axis and each attached to the rear wheel at its axis, each of the sprockets in the plurality having an individual sprocket ratio relative to the first sprocket and having a periphery disposed on an imaginary line extending in a particular direction relative to the peripheries of the other sprockets in the plurality and having a disposition substantially parallel to the rear wheel, support means having a first end attached to the frame at the axis of the wheel, the support means having a second end, an additional sprocket disposed in a direction substantially parallel to the rear wheel, first means operatively coupled to the second end of the support means and to the additional sprocket for moving the additional sprocket linearly in the particular direction to a position for alignment with an individual one of the sprockets in the plurality, a chain extending around the additional sprocket and the individual one of the sprockets in the plurality, second means for attaching the support means to the frame at a position displaced from the axis of the rear wheel, and third means for attaching the support means to the frame at the axis of the rear wheel, the support means being pivotable from a position blocking the axis of the rear wheel and the axes of the sprockets in the plurality upon the detachment of the second means from the support means and the frame.

* * * * *